United States Patent

Blonsky

[15] 3,637,250
[45] Jan. 25, 1972

[54] GRAPPLE

[72] Inventor: Joseph E. Blonsky, Atlanta, Ga.

[73] Assignee: American Pulpwood Association, New York, N.Y.

[22] Filed: Dec. 7, 1970

[21] Appl. No.: 95,514

[52] U.S. Cl. .................................................294/88, 294/106
[51] Int. Cl. ..............................................................B66c 3/16
[58] Field of Search.....................294/88, 101, 106, 113, 114

[56] References Cited

UNITED STATES PATENTS 2,959,444   11/1960   Callender ................................294/88
3,513,998   5/1970   Stone........................................294/88

*Primary Examiner*—Evon C. Blunk
*Assistant Examiner*—I. Kenneth Silverman
*Attorney*—Walter M. Rodgers

[57] ABSTRACT

A grapple adapted for mounting on vehicles such as farm tractors includes an open-ended housing structure having top, bottom and spaced sidewalls together with a main medial supporting plate interconnected integrally with the top and bottom walls. The web plate and the top and bottom walls are formed of a section of a conventional I-beam. A pair of tines are pivotally mounted one on each side of the web plate on stub shafts near the open ends of the housing structure and motive means within the housing imparts operating movement to the tines. The tines are interconnected with each other by means of a system of coupling cranks affixed to the stub shafts and an interconnecting coupling link and the entire structure is supported by the vehicle on a transverse swivel bar supported by the tractor which is received within a swivel cavity formed atop the housing structure and rigidly secured thereto. The swivel cavity is arranged so as to accommodate angular movement or yaw of the grapple relative to the vehicle and its associated swivel bar.

9 Claims, 6 Drawing Figures

INVENTOR.
JOSEPH E. BLONSKY

BY Walter M. Rodgers
ATTORNEY

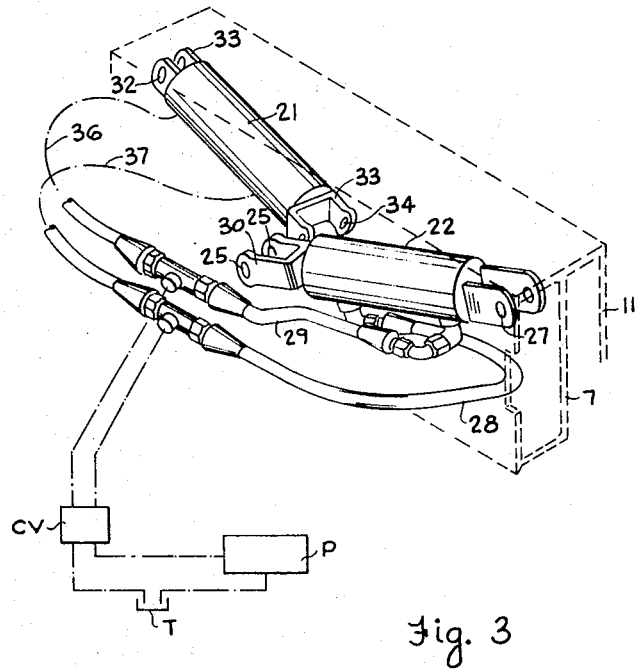
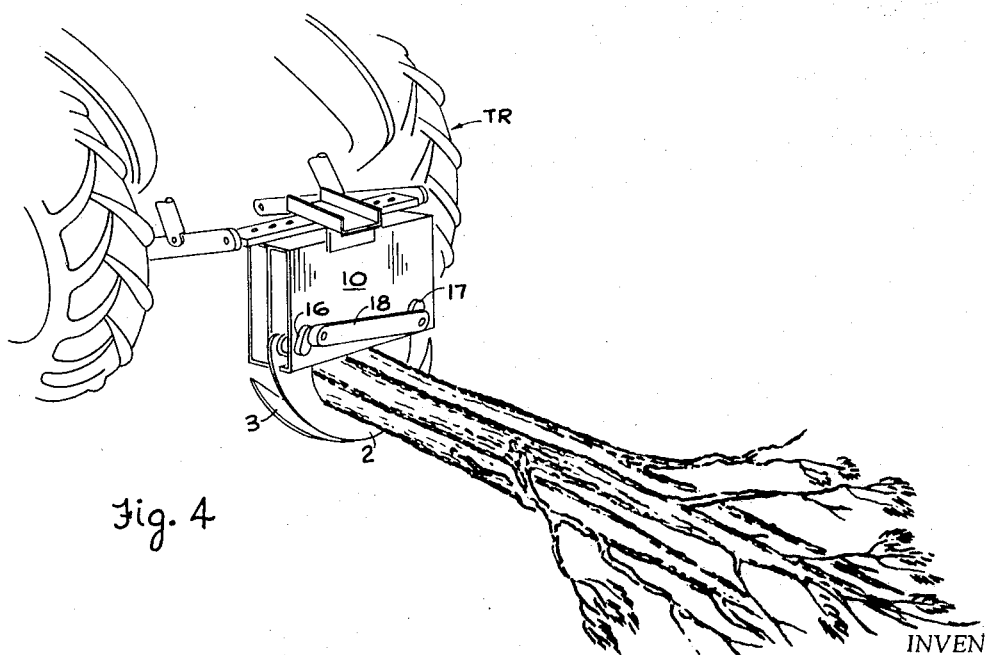

INVENTOR.
JOSEPH E. BLONSKY

BY Walter M. Rodgers
ATTORNEY

GRAPPLE

Known grapple devices for handling small and medium sized trees ordinarily are mounted on heavy duty cumbersome and expensive vehicles of one type or another. Such devices are not only expensive to construct and maintain, such mechanisms are cumbersome and difficult to maneuver amid the stumps and other debris which usually attend felling operations, particularly for small trees.

Great quantities of small trees are never used under present harvesting practices due in part to the heavy reliance which is placed on hand labor and the attendant hazards and expense of such practices. According to this pivoting harvesting techniques are largely mechanized and thus improved efficiency and lowered costs are made possible. Furthermore, safety of invention to operator is greatly enhanced.

According to this invention, a grapple is provided which is mechanically strong, economical to manufacture and maintain and which is readily maneuverable due to its adaptability for mounting on ordinary readily available farm tractors and on similar devices. More specifically, an I-beam section constitutes the basic supporting structure of the device and other elements are standard channels, plates, rods and the like. According to one feature of the invention, farm tractor hydraulic mechanisms may readily be utilized to operate a pair of fluid motors which impart operating movement to the grapple tines.

For a better understanding of the invention, reference may be had to the following detailed description taken in conjunction with the accompanying drawings in which FIG. 1 is a perspective view of a grapple constructed according to the invention;

FIG. 3 is a schematic view of a pair of fluid motors used to operate the tines of the grapple:

FIG. 4 is a perspective view showing a portion of a tractor on which the grapple of this invention is mounted and in which the tines are depicted in closed tree enveloping position;

FIG. 5 is a cutaway perspective view somewhat similar to FIG. 1 and which shows the interrelation between the tines and the interior operating mechanism for one tine and in which

Figure 1:
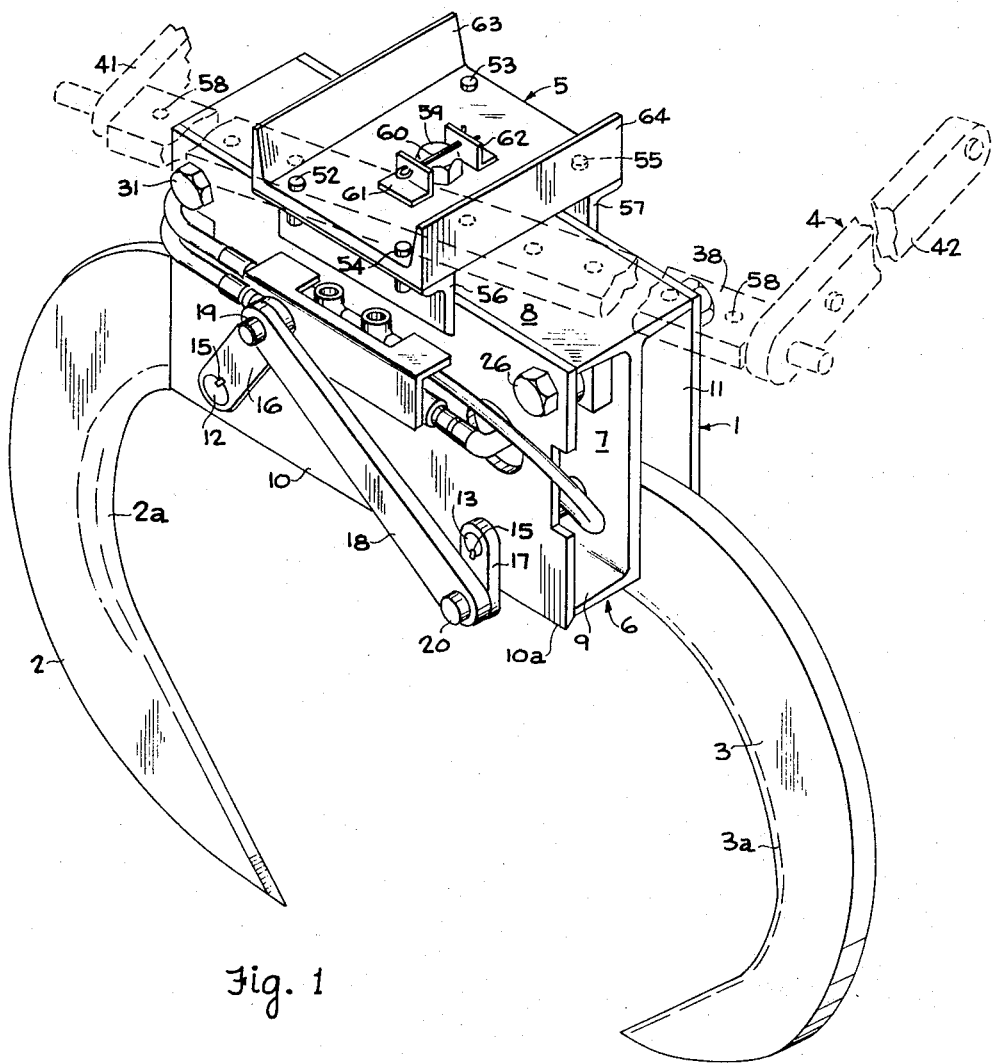

In the drawings the numeral 1 generally designates the housing structure of the invention while the numerals 2 and 3 designate the two tines of a grapple constructed according to the invention. Tines 2 and 3 are provided with knife edges as indicated at 2a in connection with tine 2. The numeral 4 generally designates supporting structure whereby the grapple is movably supported by the associated vehicle and the numeral 5 generally designates the structure which defines a swivel cavity atop the housing 1 and which receives a portion of the supporting structure 4.

The housing structure 1 comprises an I-beam generally designated by the numeral 6 and which comprises a main medial supporting web plate 7 together with top flange 8 and bottom flange 9 integrally formed with web plate 7. Flange 8 constitutes the top wall of the housing structure 1 while flange 9 constitutes the bottom wall of housing 1. As is obvious, particularly in FIG. 1, the housing structure is open-ended and the sidewalls 10 and 11 are simply secured at their upper and lower edges to the side edges of top walls 8 and 9. This junction may be effected by welding or by any other suitable means. Sidewall 10 is constructed with a knife edge 10a along its lower edge.

For the purpose of affording a pivotal mounting for tines 2 and 3, a pair of stub shafts 12 and 13 are journally mounted within apertures formed in sidewalls 10 and 11 and in main medial supporting web plate 7. The tines 2 and 3 are respectively secured to shafts 12 and 13 by suitable locking pins 14 and a pair of coupling cranks 16 and 17 are affixed to and rotatable with their associated stub shafts 12 and 13 in any suitable manner as by locking pins 15 welding or otherwise.

In order to insure that the tines 2 and 3 operate in unison and in the desired direction, coupling cranks 16 and 17 are interconnected by coupling link 18 which is pivotally connected to coupling crank 16 by coupling pin 19 and to coupling crank 17 by coupling pin 20. Thus, as is obvious from FIG. 1, clockwise rotation of tine 3 about its stub shaft 13 tends to impart transverse motion generally toward the left and upwardly to coupling link 18 and such motion is accompanied by counterclockwise rotation of coupling crank 16 and of tine 2. In this manner positive grappling action is insured.

Figure 5:
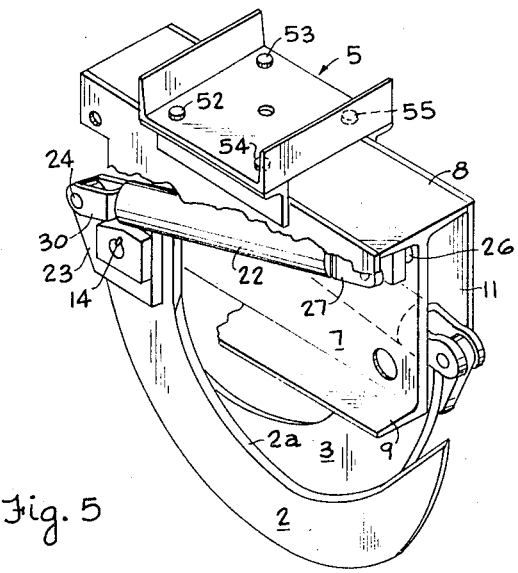

For the purpose of imparting operating motion to the tines 2 and 3, a pair of fluid motors 21 and 22 are mounted within housing 1 and are interconnected with the crank arm portions of the tines. In FIG. 5 the crank arm portion 23 may be seen as constituting an integral rigidly affixed extension of tine 2. A similar crank arm extension is affixed to the tine 3 but such extension is not visible in the drawings. Crank extension 23 is interconnected by a suitable pivot pin which extends through aperture 24 formed in crank arm 23 and through the aperture 25 formed in a portion of fluid motor 22. The other end of fluid motor 22 is pivotally interconnected with housing by bolt 26 which extends through aperture 27 formed in fluid motor 22. Of course, fluid motor 22 simply constitutes a cylinder in which an operating piston is mounted and fluid is supplied by schematically represented lines 28 and 29 to the two ends of the fluid motor 22. Thus, operating motion is imparted to the clevis element 30 in which apertures 25 are provided in either direction depending on the direction of fluid flow into the fluid motor as is obvious from FIG. 3, for example.

Fluid motor 21 is identical in construction to fluid motor 22 and is pivotally mounted at one end by bolt 31 which extends through apertures 32 formed in the clevis element 33 constituting a portion of fluid motor 21. Similarly a pin (not shown) is pivotally mounted in aperture 34 formed in clevis 33 and interconnects with the crank not shown of tine 3. Fluid is supplied to the opposite ends of the cylinder of fluid motor 21 via conduits 36 and 37.

For the purpose of accommodating swinging movement of the tines 2 and 3, the end portions of the bottom wall 9 are cut away on opposite sides of main medial supporting web plate 7 as is obvious from FIGS. 1 and 5.

Figure 2:
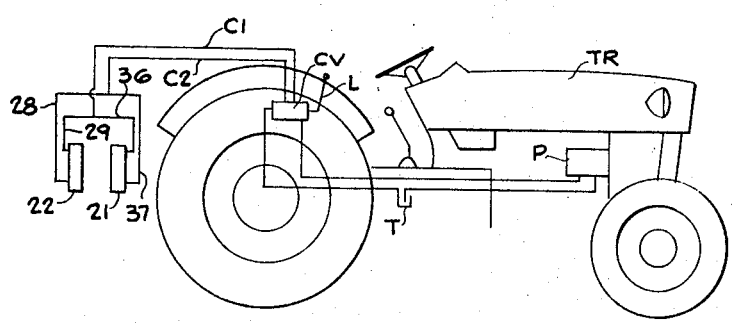
FIG. 2 is a schematic side view of an ordinary farm tractor showing the hydraulic system of the tractor in conjunction with the hydraulic mechanism utilized in conjunction with the invention.

The control system for the grapple as shown schematically in FIGS. 2 and 3 comprises a pump "P" mounted on the tractor and constituting an integral part of the tractor hydraulic system, a tank "T" which also forms a part of the tractor hydraulic mechanism together with the control valve "CV" having an operating "L" which is arranged to supply fluid selectively through conduits C1 and C2 to lines 28 and 29 and in turn to fluid motor 22 and to lines 36 and 37 and in turn to fluid motor 21. Thus movement of the lever "L" to one operating position supplies fluid pressure through conduit C1 to lines 29 and 36 to impart operating movement in one direction to the pistons of fluid motors 21 and 22. Likewise, movement of the control lever "L" to another operating position causes fluid pressure to be supplied to conduit C2 and lines 28 and 37 to cause fluid motors 21 and 22 to operate in the opposite direction. By this means the tines 2 and 3 are positively swung toward open and toward closed positions.

For the purpose of providing an articulated mounting for the grapple, the grapple mounting structure 4 is provided with a supporting swivel bar 38 pivoted at its ends in apertures 39 and 40 to support bars 41 and 42. Support bar 41 is pivoted at 43 to the tractor and support bar 42 is pivoted at 44 to the tractor. Support bars 41 and 42 are stiffened by reinforcing bars such as is indicated at 41a in connection with support bar 41.

Operating movement up and down to the support bars 41 and 42 is provided by lift arms 45 which are pivotally connected at 46 to bars 41 and 42. Conventional motive means associated with the tractor provides operating force to lift arms 45 and imparts swinging movement to arms 41 and 42 about their centers 43 and 44.

Figure 6:
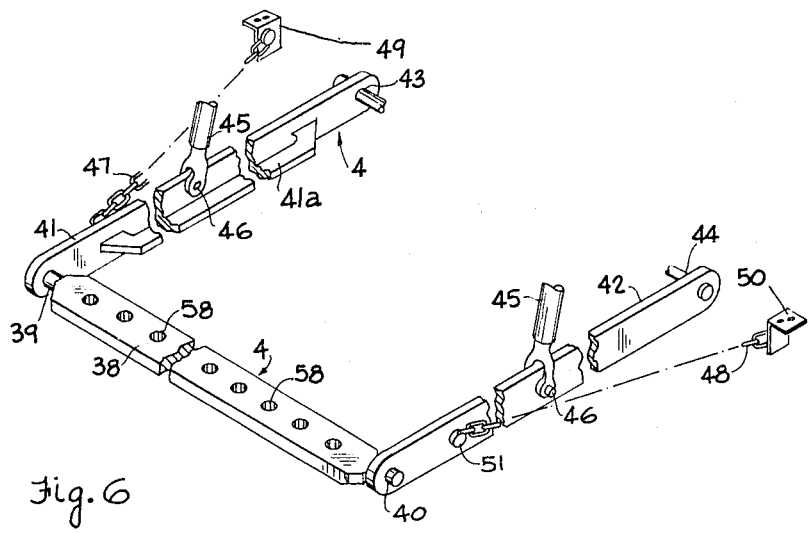
FIG. 6 is a perspective view of the mechanism by which the grapple of this invention is mounted on a conventional tractor.

In order to secure the arms 41 and 42 against substantial transverse movement, a pair of connecting elements such as chains 47 and 48 are respectively connected to the tractor by brackets 49 and 50 and to the swing ends of the bars 41 and 42 by suitable means such as the bolt 51 as shown in FIG. 6 and associated with chain 48.

For supporting the grapple, the supporting swivel bar 38 is pivoted at its ends in the apertures 39 and 40 and is received within a swivel cavity disposed below the transverse plate 5 which in turn is mounted by bolts or rivets such as 52, 53, 54 and 55 to a pair of angle iron sections 56 and 57 which preferably are welded to the upper portions of side plates 10 and 11. A plurality of apertures 58 are formed in the swivel bar 38 and selectively receive a pin 59 inserted through an aperture formed in plate 5 and held down by a transverse retaining pin 60 disposed above the upper end of pivot pin 59 and secured at its ends in apertures formed within brackets 61 and 62 which in turn are welded or otherwise secured atop the plate 5. As is obvious in FIG. 1 for example, the plate 5 is a section of a conventional channel having flanges 63 and 64 which extend upwardly. Furthermore, structures 56 and 57 constitute ordinary angle iron sections.

Suitable control mechanisms on the tractor are utilized to impart a lowering force to lift arms 45 which action in turn causes the arms 41 and 42 and the swivel bar 38 to be lowered. This action of course lowers the entire housing structure.

After a group of logs are grasped by closing movement of tines 2 and 3, a lifting force is applied to lift arms 45 and the tractor moves to a desired location and knife edges 10a, 2a and 3a grip and hold the logs against longitudinal movement related to the grapple.

As is obvious from FIG. 1 angular motion or yaw of the grapple is possible due to the fact that the swivel cavity defined by plate 5 and by angles 56 and 57 allows for rotary motion of the grapple about the pin 59. This action accommodates turning and maneuvering of the tractor.

From the above description, it is clear that by the invention, a grapple is provided which is easily fabricated and assembled and which requires no special or costly jigs and fixtures.

The embodiments of the invention in which an exclusive property or privilege is claimed are defined as follows:

1. A grapple for enveloping one or more elongated objects and comprising top, bottom and spaced sidewalls interconnected along their edges to form an open end housing structure, a main medial supporting web plate interposed between said sidewalls and integrally connected along its top and bottom edges with said top and bottom walls, said web plate and said top and bottom walls constituting an I-beam section, a first grapple tine pivotally mounted within said housing on one side of said web plate and near one end of said housing, a second grapple tine pivotally mounted within said housing on the other side of said web plate and near the other end of said housing, said bottom wall being cut away in the regions thereof immediately below the pivotal mountings for said tines so as to accommodate swinging movement of said tines about their pivotal mountings toward and away from each other, and motive means disposed at least partially within said housing and interconnected with said tines for imparting swinging movement thereto.

2. A grapple according to claim 1 wherein the pivotal mounting for each of said tines comprises a transversely disposed stub shaft mounted in apertures formed in said sidewalls and in said web plate.

3. A grapple according to claim 2 wherein said tines are secured to and movable with said stub shafts and wherein a coupling crank is fixedly mounted on each of said stub shafts and wherein a coupling link is pivotally connected at its ends to the swing ends of said coupling cranks respectively.

4. A grapple according to claim 3 wherein the angular disposition of the axis of each of said coupling cranks relative to its associated stub shaft and tine and the length of said coupling link are such that said tines swing in unison in opposite directions about their stub shafts as centers.

5. A grapple according to claim 1 wherein a hollow open ended swivel cavity is formed atop said top wall and rigidly secured to said housing and wherein a generally horizontal supporting swivel bar is disposed within said swivel cavity in a manner to accommodate angular movement or yaw of said housing relative to said bar in a generally horizontal plane and wherein said swivel bar is supported at its ends on a vehicle.

6. A grapple according to claim 5 wherein said swivel cavity is defined by a pair of spacer bars secured to said sidewalls and arranged to protrude above said top wall and by a transverse plate element secured to the upper edges of said spacer bars.

7. A grapple according to claim 6 wherein said plate element comprises a channel structure whose flanges extend upwardly.

8. A grapple according to claim 6 wherein said plate element and said swivel bar are pivotally interconnected by a vertically disposed pivot pin.

9. A grapple according to claim 8 wherein a pair of spaced-apart pin retaining brackets are secured to the upper surface of said plate element on opposite sides of said pivot pin and wherein a transverse retaining pin is removably mounted in said brackets and disposed astride the upper end of said pivot pin.

* * * * *